United States Patent Office.

HENRY V. EDMOND, OF NORWICH CONNECTICUT.

Letters Patent No. 103,999, dated June 7, 1870.

IMPROVEMENT IN THE MANUFACTURE OF FROSTED PLUSH, PAPER, &c.

The Schedule referred to in these Letters Patent and making part of the same.

*To all whom it may concern:*

Be it known that I, HENRY V. EDMOND, of Norwich, in the county of New London and State of Connecticut, have invented a new and useful Improvement in the Manufacture of Frosted Plush of any Woolen and Cotton Fabric, Paper, or other material; and I do hereby declare the following to be a full, clear, and exact description of the method of preparation and manufacture of the same.

My invention relates to a new method or process of frosting plush, or any woolen and cotton fabric, paper, or other material, for banners, letters, ornamentations, and other purposes, and consists in the use of a preparation of gelatine, glycerine, and water, of any desired color, sprayed upon the surface of the material, by which the frosting of glass, mica, or other crystalline equivalent is affixed uniformly to said material over a large surface at once, in the same or differing colors.

The solution which forms the coating for the frosting for a given quantity, say one pint, consists of gelatine, five drachms; glycerine, one ounce, and a pint of water, or their equivalents, to which may be added any suitable color, to impart to the material to be frosted the desired shade.

The method of applying this solution consists in spraying it equally over the surface of the material by means of a vaporizer, and then sifting the mica, glass, or other crystalline equivalent, rapidly over the prepared surface, and when dry the crystalline substance will adhere thereto.

In spraying the solution over the material it is made to cover it in small globules like dew, and thus prevents it from penetrating the fabric, and from becoming matted, which is the case when covered with a pasting-material by means of a brush. It, moreover, enables me to spread the solution more evenly over the surface, and thus prevent irregularity in the appearance of the frosted surface, because the frosting cannot adhere to the material in hills when the surface is prepared by the spraying method.

The solution may be prepared of any color by suitable dyes, and used so that the same piece may be frosted with different shades, and the vaporizer may be of any suitable construction that will spray the solution properly over the surface of the material to receive the frosting.

The use of gelatine and glycerine in the sizing, when dry, forms an elastic and pliable surface not liable to split in handling and rolling the material, thereby rendering the article a much more marketable commodity, while at the same time the adhesive quality of the gelatine, tempered by the glycerine makes the article much more durable.

By this process of spraying, I am also enabled to prepare the material in larger quantities and much more rapidly than heretofore, thereby saving labor and time in its preparation.

The prepared solution is used from a vented bottle, to the mouth of which the vaporizer is attached, and by means of the vent the flow of the liquid is presented to the opening of the vaporizer in a continuous stream, regulated as may be desired.

The solution, when cold, has a consistency of jelly, and must, therefore, be heated before using to make it flow readily, and may be put into and sprayed from a cup.

Having described my invention,

I claim—

1. The method of preparing and frosting woolen, cotton, or other material, substantially as herein described.

2. The method of shading the material to be frosted by spraying thereon different colors of the solution at the same operation, by which the material is prepared to be frosted, as herein described.

3. The use of glycerine and gelatine or their equivalents, in the solution for the preparation of the fabric to be frosted, as herein described.

4. As a new article of manufacture, woolen, cotton, or other material, prepared and frosted, with or without colors, substantially as herein described.

HENRY V. EDMOND.

Witnesses:
FRANK V. JOHNSON,
NORRIS G. LIPPITT.